Oct. 8, 1963
E. M. SCHILD
3,106,051
FOOD-BAGGING MACHINE
Filed Feb. 10, 1958
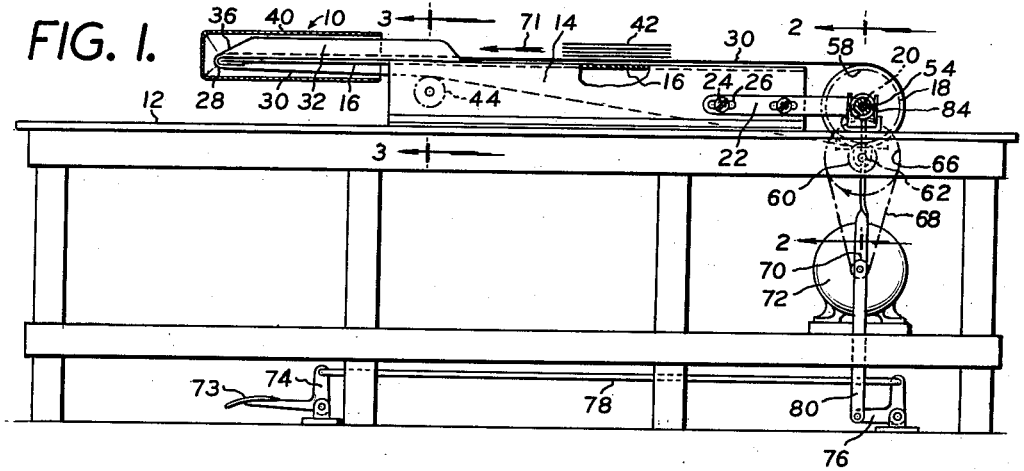
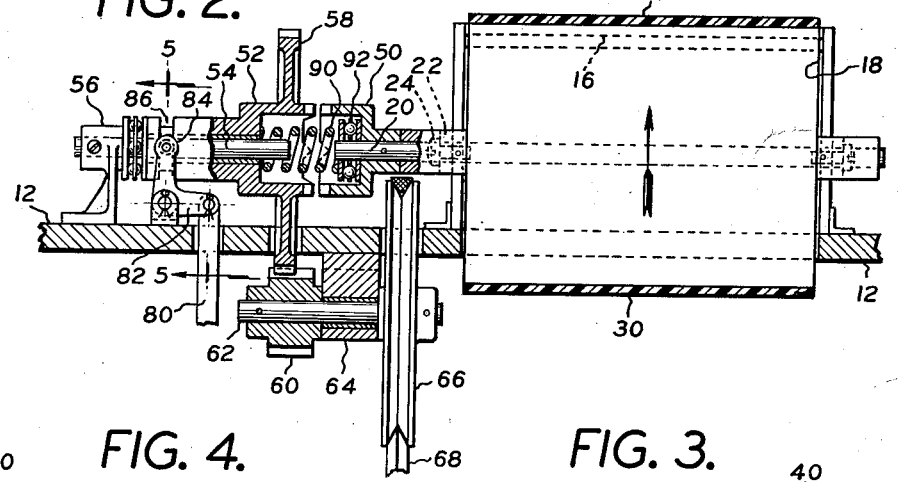
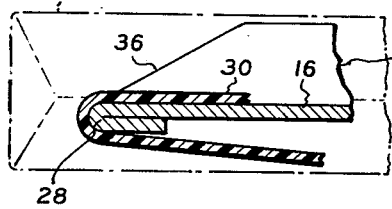
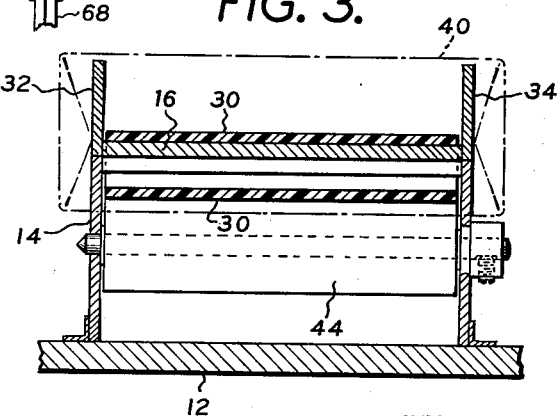
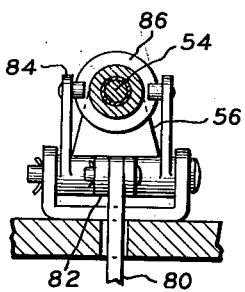
INVENTOR
EDWARD M. SCHILD
BY *Samuel J. Stree*
ATTORNEY

3,106,051
FOOD-BAGGING MACHINE
Edward M. Schild, 201—12 23rd Ave., Bayside, N.Y.
Filed Feb. 10, 1958, Ser. No. 714,119
1 Claim. (Cl. 53—259)

This invention relates to a food-bagging machine.

The invention is concerned chiefly with sliced processed foods such as sliced cheese and meats, but it may also be used in the packaging of other articles such as printed cards, machine parts, and other objects which are sold in bags. For purposes of illustration, however, the specification will deal with this invention solely in terms of its application to sliced processed foods.

In the packaging of sliced cheese, salami, and like products a handling problem arises. It is necessary to hold a plurality of such slices together in superimposed relation, and to insert them into the smallest size bag which will receive them. A neatly stacked pile of slices is required to confine the package to the smallest possible proportions. It therefore becomes necessary to hold the slices in superimposed alignment while inserting them into a bag. This is a difficult handling operation, especially since some of the food products have a high frictional coefficient. They tend to stick to the walls of the bag, and it becomes difficult to push them in without disarranging the pile.

The foregoing packaging procedure is a manual operation in many large food processing plants. It is time-consuming and costly and in many cases relatively large bags are used, not because the packaged products require bags of such size, but rather to facilitate the packaging operation.

The object of this invention is the provision of mechanical means for handling such products as sliced foods and inserting them into the smallest bags capable of accommodating them.

Stated briefly, this mechanism comprises an endless belt which is either continuously or intermittently movable, a very narrow bearing which supports the belt at the disharge end of the machine, and a pair of side walls adjacent said discharge end. The endless belt carries the sliced food products in the direction of the discharge end, and the two side walls serve as guide members adapted to keep the food products in line. A bag is slipped over said discharge end of the conveyor belt and over said side walls. The food products are automatically disposed into the bag without further handling.

Important features and advantages of this mechanism are the folowing: The narrow bearing at the discharge end of the conveyor belt occupies very little space, and it is possible to insert said discharge end of the conveyor belt into the bag to its very bottom. This has the effect of adequately supporting the food products and disposing them as deeply into the bag as they will go. Manual handling is accordingly obviated, since the food products are supported entirely on the belt and there is no need to manually guide them into the bag. This feature of the invention is predicated upon the use of the two side walls, which perform two functions. The first is that of guiding the food products properly into the bag and the second is to hold the bag open sufficiently to accommodate the food products and to enable them to enter without manipulation.

The apparatus herein claimed may be made in various sizes and forms determined by the nature and proportions of the products which are to be packaged thereon. It is also possible to provide various forms of drive mechanisms by which the endless conveyor belt is to be powered. For example, a continuously operating rotary drive mechanism may be used where it is desired to have the apparatus pace the operator. An intermittent operation could also be used for this purpose, and the moving and stationary intervals and periods may be adjusted as desired. On the other hand, where it is preferred to have the operator pace the machine, a clutch mechanism may be provided, enabling the operator to stop and start the machine at intervals keyed to his own speed of operation.

The invention is illustrated in the accompanying drawing, in which:

FIG. 1 is a side view, partly in vertical section, of a bag-filling mechanism made in accordance with this invention.

FIG. 2 is a fragmentary, enlarged vertical section on the line 2—2 of FIG. 1, showing the drive mechanism of the machine.

FIG. 3 is another vertical section on the line 3—3 of FIG. 1.

FIG. 4 is an enlarged fragmentary section showing the discharge end of the machine.

FIG. 5 is a section on the line 5—5 of FIG. 2 showing the clutch mechanism.

The bag-filling apparatus 10 shown in the drawing may be mounted on a table 12 of convenient size. The bag-filling apparatus includes a frame 14 which is mounted on table 12 and which supports an elongated plate 16. At the back end of frame 14 is a roller 18 mounted on shaft 20, which is supported on arms 22. These arms are secured to frame 14 by means of screws 24 extending through slots 26. The supporting arms are thereby adjustably secured to the frame for longitudinal adjustment relative thereto. The forward or discharge end of elongated plate 16 is folded under upon itself to form a rounded bearing 28 of relatively small cross-sectional dimensions.

It will now be seen that mounted on plate 16 and roller 18 is an endless conveyor belt 30. This conveyor belt is made of relatively thin sheet material such as Teflon or nylon or like material. Teflon is a plastic material consisting of a tetrafluoroethylene polymer, and it is made by the Du Pont Company. It is characterized by outstanding chemical resistance to reaction with the fats and acids which are normally encountered in food products of the character under discussion. Furthermore, this material is virtually self-lubricating, and it is possessed of good tensile strength and high resistance to abrasion.

A nylon or Teflon belt approximately 1/32" thick performs exceedingly well in the apparatus herein disclosed and claimed. Plate 16 is also made of relatively thin sheet material such as a stainless steel sheet approximately 1/16" thick. As shown in FIG. 4, the bearing end of said plate is only twice as thick as the plate itself and this means that the bearing would be approximately 1/8" thick with a 1/16" radius. These dimensions are merely illustrative and may be varied to meet individual preferences and requirements. It is evident from these illustrative figures that the total thickness of the conveyor belt at its discharge end, including its upper and lower runs and the double thickness of supporting plate 16 would come to only 3/16".

At said discharge end of supporting plate 16 is a pair of side walls 32 and 34 respectively which serve several functions of which two are indicated above. These side walls are beveled at their forward ends 36 to facilitate drawing a bag 40 over them. These forward ends of the side walls serve as wedging or camming elements, which tend to open the bag when it is slipped over them and the walls themselves hold the bag in such open position during the filling operation.

A series of superimposed slices of food 42 is carried forwardly on conveyor belt 30, as FIG. 1 clearly shows, and side walls 32 and 34 are thereby enabled to function as guide plates to keep these slices in line while they are being fed into the bag.

The effective height of side walls 32 and 34 above the level of the upper run of conveyor belt 30 slightly exceeds the height of the pile of slices 42 and the bag is accordingly held wide open to receive these food slices without digital or manual handling. As each pile of slices is fed into a bag, it automatically pushes the bag off the machine and another bag is substituted in its place. This operation of mounting the bags in operative position and then letting the machine automatically fill them and drop them to a collecting bin, conveyor or the like (not shown) is a very simple operation which consumes very little time and effort.

It will be evident from FIG. 1 of the drawing and from the foregoing description that the bags may be slipped over the discharge end of the machine as far as necessary to enable the conveyor belt to feed the food slices into the very bottom of the bags. This is rendered possible by the very limited dimensions of bearing 28 and the conveyor belt 30 itself. Also, an idler roller 44 is provided on frame 14 a sufficient distance behind the discharge end of the machine to support the lower run of the belt in close proximity to the supporting plate 16.

Turning now to the drive and control mechanism by which the belt is operated, it will be observed that a shaft 20 is secured to a sleeve 50 which constitutes a toothed clutch member. A cooperating toothed clutch member 52 is disposed opposite the first clutch member, and it will be observed that the second clutch member is mounted on a shaft 54 which is journaled into a suitable bearing 56. A gear wheel 58 is formed integrally with clutch member 52, and it engages a pinion 60 on shaft 62. Shaft 62 is supported in bearing 64, and it is connected to a pulley 66 which is driven by belt 68 connected to another pulley 70 on motor 72. When the motor operates and the clutch members are connected, this train of drive elements will cause roller 18 to rotate and thereby cause the belt to move longitudinally of itself in the direction of arrow 71 in FIG. 1. This of course is also the direction of movement of the food slices 42, since they are carried by the belt.

A pedal 73 is provided for operation of the clutch. This pedal is connected to a bell-crank 74 which actuates a second bell-crank 76 through a pull rod 78. A second pull rod 80 connects the second bell-crank 76 with a third bell-crank 82. The latter bell-crank is provided with roller 84 which engage an annular groove 86 in clutch member 52. Reference to FIG. 2 will disclose the fact that a compression spring 90 is disposed between the two clutch members, one end of said spring bearing against clutch member 52 and the opposite end bearing against a thrust bearing 92 mounted within clutch member 50. The spring acts to urge the two clutch members apart, and when this is done the drive mechanism is disconnected or disengaged from the belt. However, when pedal 73 is depressed by the operator of the machine, clutch member 52 is moved into engagement with clutch member 50 against the action of spring 90. The clutch is now engaged, and operation of the drive mechanism causes operation of the conveyor belt.

The foregoing is purely illustrative of a preferred form of this invention, and modifications and variations may be incorporated therein. For example, the clutch mechanism shown in the drawing simply illustrates a suitable mechanism for the purpose indicated, and obviously other clutch mechanisms may be incorporated into the machine to perform the same function.

I claim:

Bagging apparatus for inserting articles of food and the like into bags, comprising an endless imperforate plastic conveyor belt approximately $\frac{1}{32}$ of an inch thick and adapted to support such articles, a drive roller supporting the back end of said endless conveyor belt, a relatively thin metal supporting plate approximately $\frac{1}{16}$ of an inch thick and provided below the upper run of the conveyor belt in supporting relation thereto, the forward end of said supporting plate being folded under and rounded with approximately a $\frac{1}{16}$ inch radius to provide a relatively narrow bearing supporting the forward end of said conveyor belt, said supporting plate being co-extensive in width with the conveyor belt in order to provide full transverse support for said conveyor belt, the combined cross-sectional dimensions of said relatively narrow bearing and the forward end of said conveyor belt being such as to render it possible to slip an open bag over them, said relatively narrow bearing and the forward end of said conveyor belt being adapted to occupy relatively little space within the bag and thereby permitting the bag to be filled relatively full with articles of food, the open mouth of the bag facing the back end of the conveyor belt and the forward end of the conveyor belt projecting toward the bottom of the bag, and drive means connected to said drive roller for moving the conveyor belt longitudinally of itself in such direction as to carry an article supported thereby into the open bag, said supporting plate at its forward end having a pair of beveled spaced side walls, respectively, the tapering thereof at their forward ends terminating adjacent said rounded bearing.

References Cited in the file of this patent

UNITED STATES PATENTS

| | | |
|---|---|---|
| 254,455 | Burley | Mar. 7, 1882 |
| 1,687,393 | Scott | Oct. 9, 1928 |
| 2,110,359 | Droll et al. | Mar. 8, 1938 |
| 2,360,257 | Muller et al. | Oct. 10, 1944 |
| 2,430,282 | Ensinger | Nov. 4, 1947 |
| 2,540,489 | Pretzer | Feb. 6, 1951 |
| 2,556,008 | Spalding | June 5, 1951 |
| 2,645,343 | Nemir | July 14, 1953 |
| 2,693,304 | Davis et al. | Nov. 2, 1954 |